(12) United States Patent
Wu

(10) Patent No.: US 10,533,631 B2
(45) Date of Patent: Jan. 14, 2020

(54) TRANSMISSION BELT

(71) Applicant: KMC CHAIN INDUSTRIAL CO., LTD., Tainan (TW)

(72) Inventor: Daniel Wu, Tainan (TW)

(73) Assignee: KMC CHAIN INDUSTRIAL CO., LTD., Tainan (TW)

( * ) Notice: Subject to any disclaimer, the term of this patent is extended or adjusted under 35 U.S.C. 154(b) by 148 days.

(21) Appl. No.: 15/638,836

(22) Filed: Jun. 30, 2017

(65) Prior Publication Data

US 2018/0010667 A1   Jan. 11, 2018

(30) Foreign Application Priority Data

Jul. 7, 2016 (TW) .............................. 105121648 A

(51) Int. Cl.
| | |
|---|---|
| *F16G 5/10* | (2006.01) |
| *F16G 3/02* | (2006.01) |
| *F16G 3/04* | (2006.01) |
| *F16G 5/16* | (2006.01) |
| *F16G 5/20* | (2006.01) |
| *F16G 1/10* | (2006.01) |
| *F16G 5/08* | (2006.01) |
| *F16G 1/28* | (2006.01) |

(52) U.S. Cl.
CPC ............... *F16G 5/10* (2013.01); *F16G 1/10* (2013.01); *F16G 1/28* (2013.01); *F16G 3/02* (2013.01); *F16G 3/04* (2013.01); *F16G 5/08* (2013.01); *F16G 5/16* (2013.01); *F16G 5/20* (2013.01)

(58) Field of Classification Search
CPC ..... F16G 5/10; F16G 5/16; F16G 5/08; F16G 5/20; F16G 13/00; F16G 3/08; F16G 1/10; F16G 3/02; F16G 3/04

USPC ................. 474/253, 256, 257, 260
See application file for complete search history.

(56) References Cited

U.S. PATENT DOCUMENTS

| 948,350 A * | 2/1910 | Skidmore ................. F16G 3/00 |
| | | 24/31 L |
| 2,362,949 A * | 11/1944 | Tingley ..................... F16G 7/00 |
| | | 24/33 B |

(Continued)

FOREIGN PATENT DOCUMENTS

| DE | 3406333 A1 | 8/1985 |
| GB | 651409 A | 4/1951 |

(Continued)

OTHER PUBLICATIONS

The Search Report issued to European counterpart application No. 17179417.5 by the EPO dated Nov. 30, 2017.

*Primary Examiner* — Michael R Mansen
*Assistant Examiner* — Mark K Buse
(74) *Attorney, Agent, or Firm* — Burris Law, PLLC

(57) ABSTRACT

A transmission belt includes a belt body, two spaced-apart mounting axles and a reinforcing unit. The belt body forms a loop that defines an inner space. The mounting axles and the reinforcing unit are embedded in the belt body. The reinforcing unit includes at least one cord that includes a plurality of winding segments and a plurality of connecting segments. The winding segments alternately extend around the mounting axles. Each of the connecting segments interconnects a corresponding pair of the winding segments that respectively extend around the mounting axles.

16 Claims, 13 Drawing Sheets

(56) References Cited

U.S. PATENT DOCUMENTS

| | | | | | |
|---|---|---|---|---|---|
| 2,847,864 | A | * | 8/1958 | Waugh | F16G 7/00 24/31 C |
| 3,058,864 | A | * | 10/1962 | Pechin, Jr. | D01G 15/56 156/137 |
| 3,222,946 | A | * | 12/1965 | Steuer | F16G 5/18 474/201 |
| 4,060,006 | A | * | 11/1977 | Abel | F16G 13/00 474/207 |
| 4,315,349 | A | * | 2/1982 | Stolz | F16G 3/04 24/33 C |
| 4,625,369 | A | * | 12/1986 | Musil | F16G 3/04 24/33 B |
| 4,654,020 | A | * | 3/1987 | Cramer | F16G 3/08 474/257 |
| 5,099,548 | A | * | 3/1992 | Loosli | B65G 15/52 198/844.2 |
| 5,308,292 | A | * | 5/1994 | Mistry | F16G 1/00 474/207 |
| 5,360,103 | A | * | 11/1994 | Loosli | B65G 15/30 198/844.2 |

FOREIGN PATENT DOCUMENTS

| | | |
|---|---|---|
| GB | 2290515 A | 1/1996 |
| WO | 2005049454 A2 | 6/2005 |

* cited by examiner

TRANSMISSION BELT

CROSS-REFERENCE TO RELATED APPLICATION

This application claims priority of Taiwanese Patent Application No. 105121648, filed on Jul. 7, 2016.

Field

The disclosure relates to a belt, and more particularly to a transmission belt.

Background

Referring to FIGS. 1, 2 and 3, a conventional transmission belt 1 is looped over two spaced-apart pulleys 10, and includes a plurality of reinforcing cords 11, a belt body 12, and a plurality of connecting pins 13. The belt body 12 is made of a flexible material, and includes a strip body 121 that forms a loop to define an inner space 120, and a plurality of spaced-apart teeth 122 each of which extends from the strip body 121 toward the inner space 120. The strip body 121 has a first longitudinal end portion 123 and a second longitudinal end portion 124 that is opposite to the first longitudinal end portion 123. The first longitudinal end portion 123 has two extensions 126 that cooperatively define a groove 125 therebetween. Each of the extensions 126 has a plurality of first connecting holes 127 that are respectively aligned with the first connecting holes 127 of the other one of the extensions 126. The second longitudinal end portion 124 is inserted into the groove 125, and has a plurality of second connecting holes 128 that are respectively aligned with the first connecting holes 127 of each of the extensions 126 of the first longitudinal end portion 123. Each of the reinforcing cords 11 is embedded in the belt body 12, and has two opposite longitudinal ends that are respectively flush with distal ends of the first and second longitudinal end portions 123, 124. Each of the connecting pins 13 is inserted into a respective one of the second connecting holes 128 of the second longitudinal end portion 124 and the aligned one of the first connecting holes 127 of each of the extensions 126 so as to interconnect the first and second longitudinal end portions 123, 124.

When the conventional transmission belt 1 is in operation, the reinforcing cords 11 are designed to bear about 80 percent of the tension in the conventional transmission belt 1. However, since each of the reinforcing cords 11 is configured to form an incomplete loop, the strength of the conventional transmission belt 1 may be limited by a binding force among the belt body 12 and the reinforcing cords 11.

SUMMARY

Therefore, an object of the disclosure is to provide a transmission belt that can alleviate the drawback of the prior art.

According to the disclosure, the transmission belt includes a belt body, two spaced-apart mounting axles and a reinforcing unit. The belt body forms a loop that defines an inner space. The mounting axles are embedded in the belt body. The reinforcing unit is embedded in the belt body. The reinforcing unit includes at least one cord that includes a plurality of winding segments and a plurality of connecting segments. The winding segments alternately extend around the mounting axles. Each of the connecting segments interconnects a corresponding pair of the winding segments that respectively extend around the mounting axles.

BRIEF DESCRIPTION OF THE DRAWINGS

Other features and advantages of the disclosure will become apparent in the following detailed description of the embodiments with reference to the accompanying drawings, of which.

DETAILED DESCRIPTION

Figure 1:
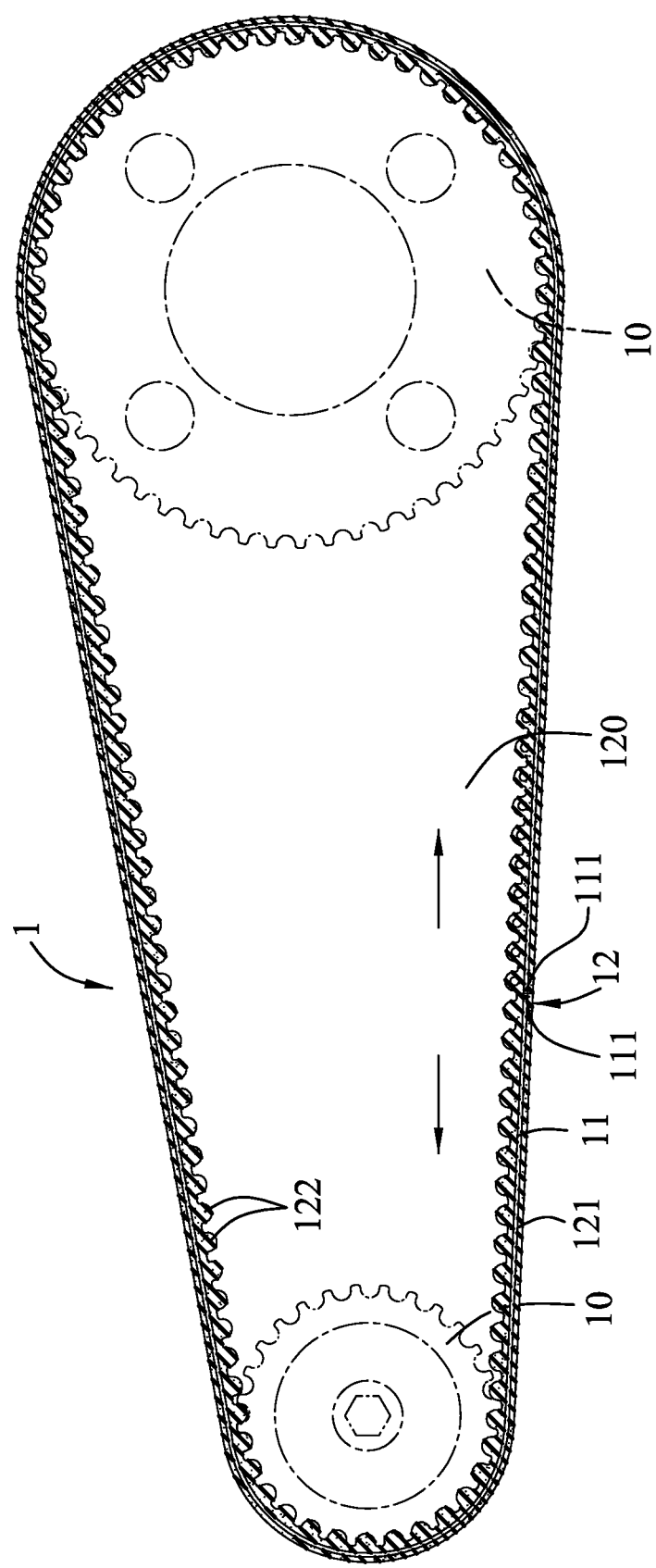
FIG. 1 is a sectional view illustrating a conventional transmission belt.
Figure 2:
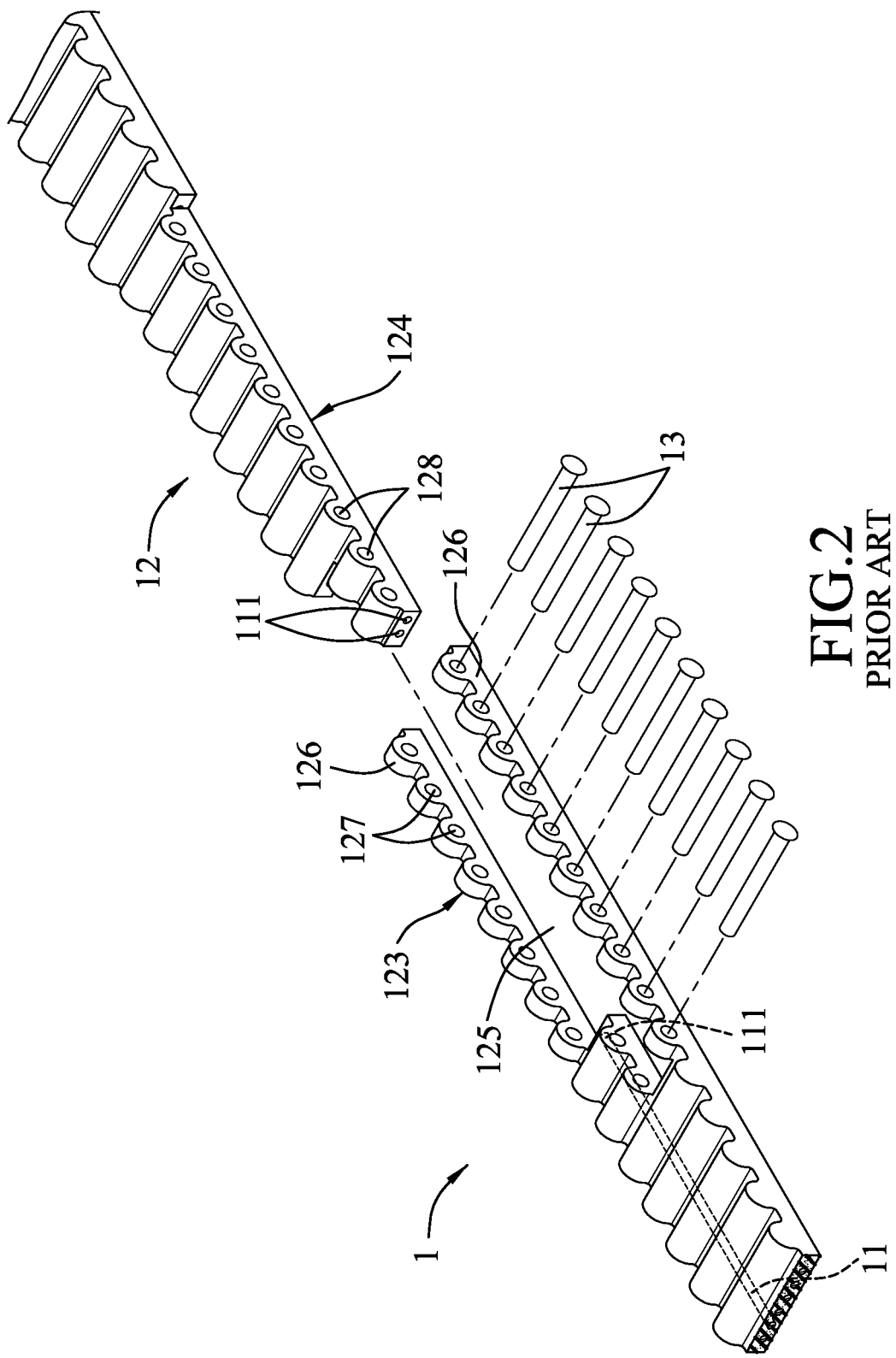
FIG. 2 is a fragmentary exploded perspective view illustrating the conventional transmission belt.
Figure 3:
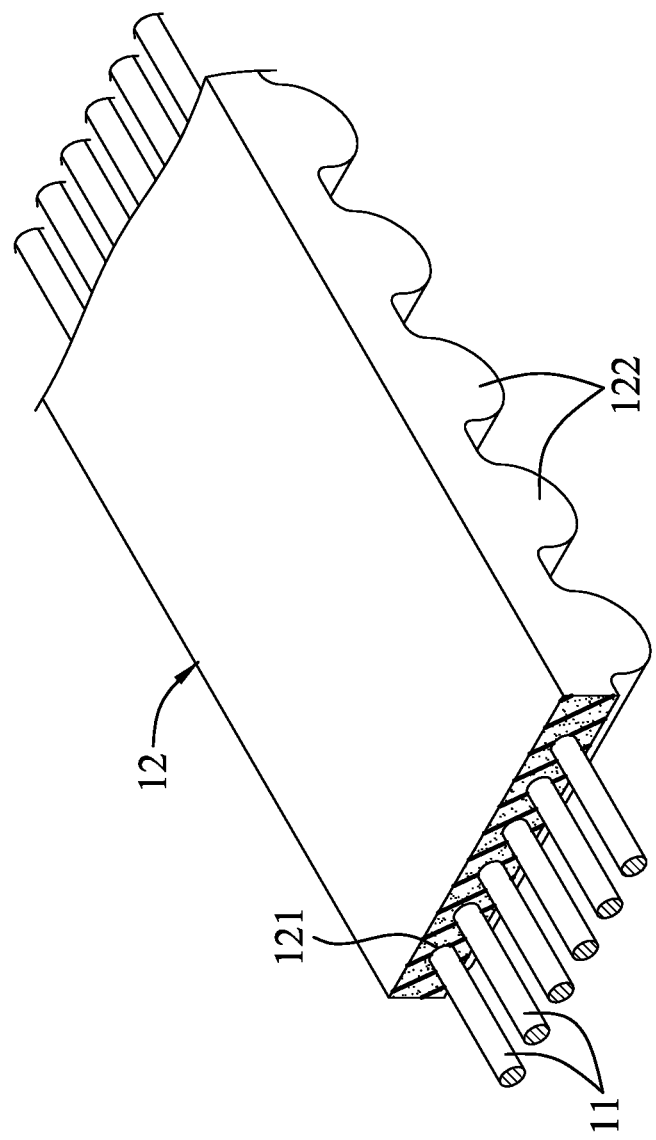
FIG. 3 is a fragmentary perspective view illustrating the conventional transmission belt.

Before the disclosure is described in greater detail, it should be noted that where considered appropriate, reference numerals or terminal portions of reference numerals have been repeated among the figures to indicate corresponding or analogous elements, which may optionally have similar characteristics.

Figure 4:
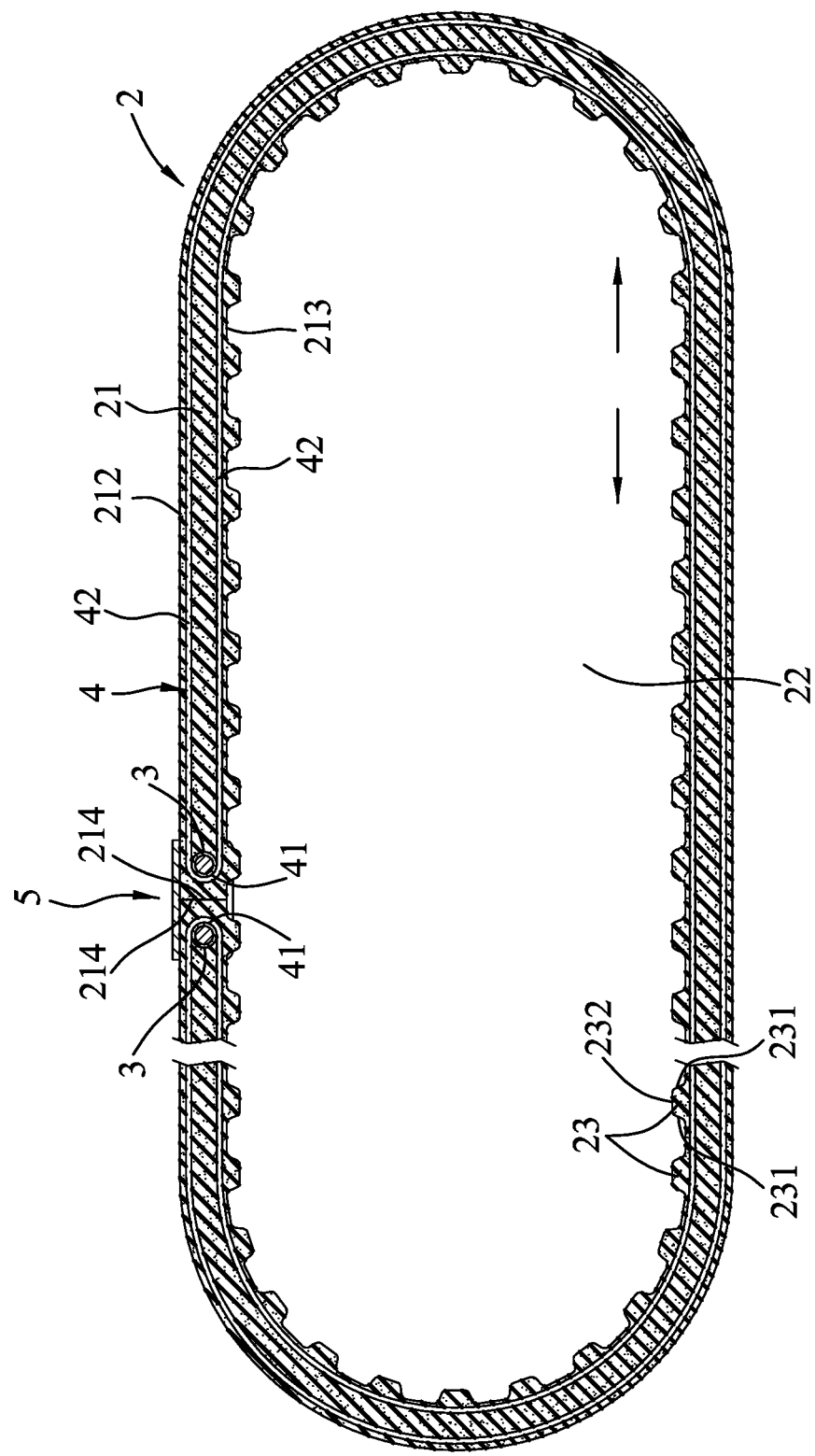
FIG. 4 is a fragmentary sectional view illustrating a first embodiment of the transmission belt according to the disclosure.
Figure 5:
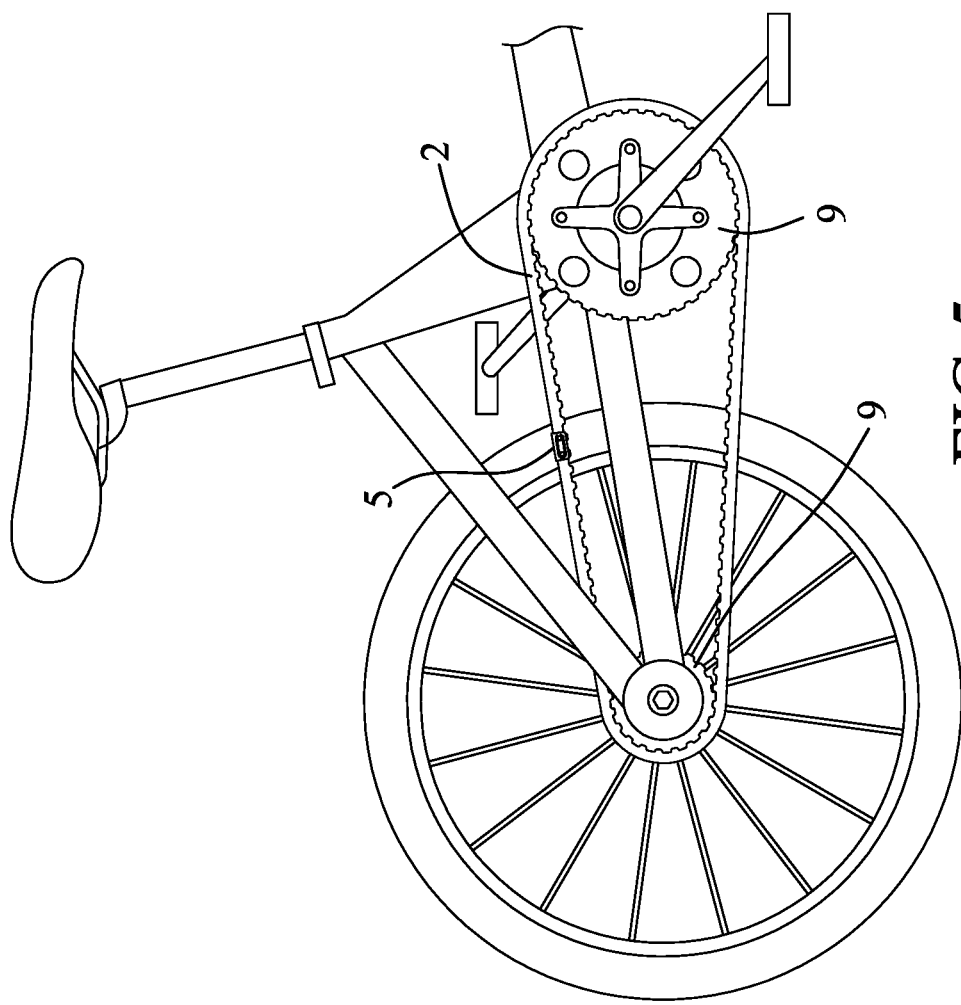
FIG. 5 is a fragmentary side view illustrating a bicycle with the first embodiment.

Referring to FIGS. 4, 5, 6 and 7, the first embodiment of the transmission belt according to the disclosure is looped over a plurality of pulleys 9 (see FIG. 5). The pulleys 9 may be mounted to a bicycle, a motorcycle or another machine. The first embodiment includes a belt body 2, two mounting axles 3 that are embedded in the belt body 2, a reinforcing unit 4 that is embedded in the belt body 2 and that extends around the mounting axles 3, and a connecting unit 5.

The belt body 2 is made of a flexible material, such as natural rubber, synthetic rubber, polyurethanes, or the like. The belt body 2 includes a strip body 21 and a plurality of spaced-apart teeth 23. The strip body 21 can form a loop by interconnecting two longitudinal ends thereof, and has an inner surface 213 that defines an inner space (22, see FIG. 4) when the strip body 21 forms the loop, an outer surface 212 that is opposite to the inner surface 213, two opposite side surfaces 211 each of which is connected between the inner and outer surfaces 213, 212, two end surfaces 214 that are respectively located at the longitudinal ends thereof, and two mounting holes 215 each of which is formed through the side surfaces 211.

Each of the teeth 23 extends from the inner surface 213 of the strip body 21 toward the inner space 22 when the strip body 21 forms the loop. In this embodiment, each of the teeth 23 has a width that decreases away from the inner surface 213, and includes two spaced-apart inclined surfaces 231, and a flat surface 232 that is connected between the inclined surfaces 231. The shape of each of the teeth 23 is not limited to such.

The mounting axles 3 are respectively disposed in the mounting holes 215 of the strip body 21 of the belt body 2. Each of the mounting axles 3 may be solid (cylindrical) or hollow (tubular), and is disposed adjacent to a respective one of the end surfaces 214 of the strip body 21. In this embodiment, each of the mounting axles 3 is hollow, and has an axial through hole 31.

In this embodiment, the reinforcing unit 4 includes a cord that is made of metal or carbon fiber tow, and has a plurality of winding segments 41 that alternately extend around the mounting axles 3, and a plurality of connecting segments 42 each of which interconnects a corresponding pair of the winding segments 41 that respectively extend around the mounting axles 3. As such, the cord forms a plurality of loops that extend around the mounting axles 3. The connecting segments 42 may be spaced apart from each other, or may abut against each other. In a variation, the reinforcing unit 4 includes a plurality of cords each of which is configured as a flexible hoop. Each of the flexible hoops (i.e., the cords) has two winding segments 41 that respectively extend around the mounting axles 3, and two connecting segments 42 each of which interconnects of the winding segments 41.

Figure 7:
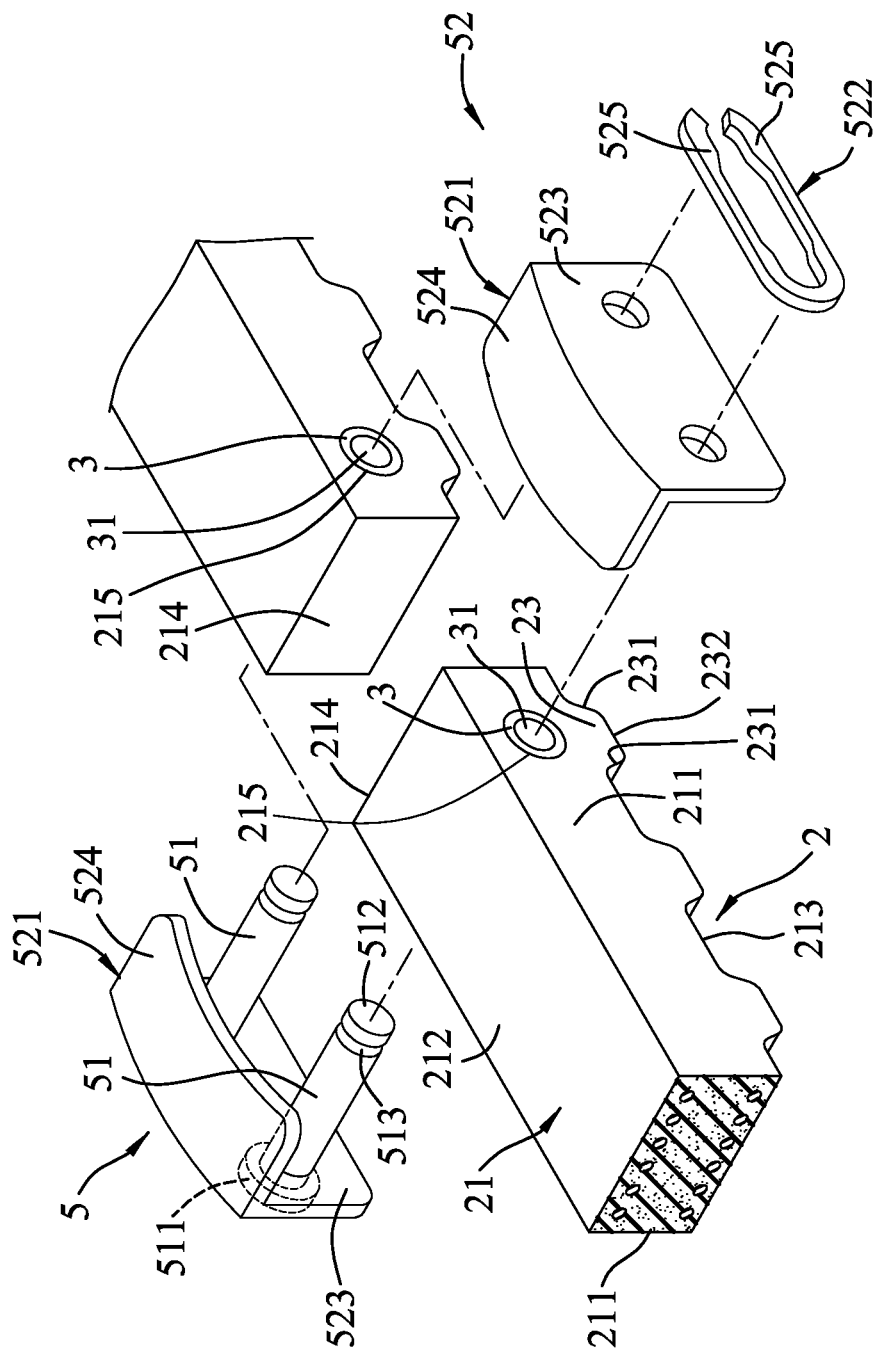
FIG. 7 is an exploded perspective view illustrating a connecting unit of the first embodiment.
Figure 8:
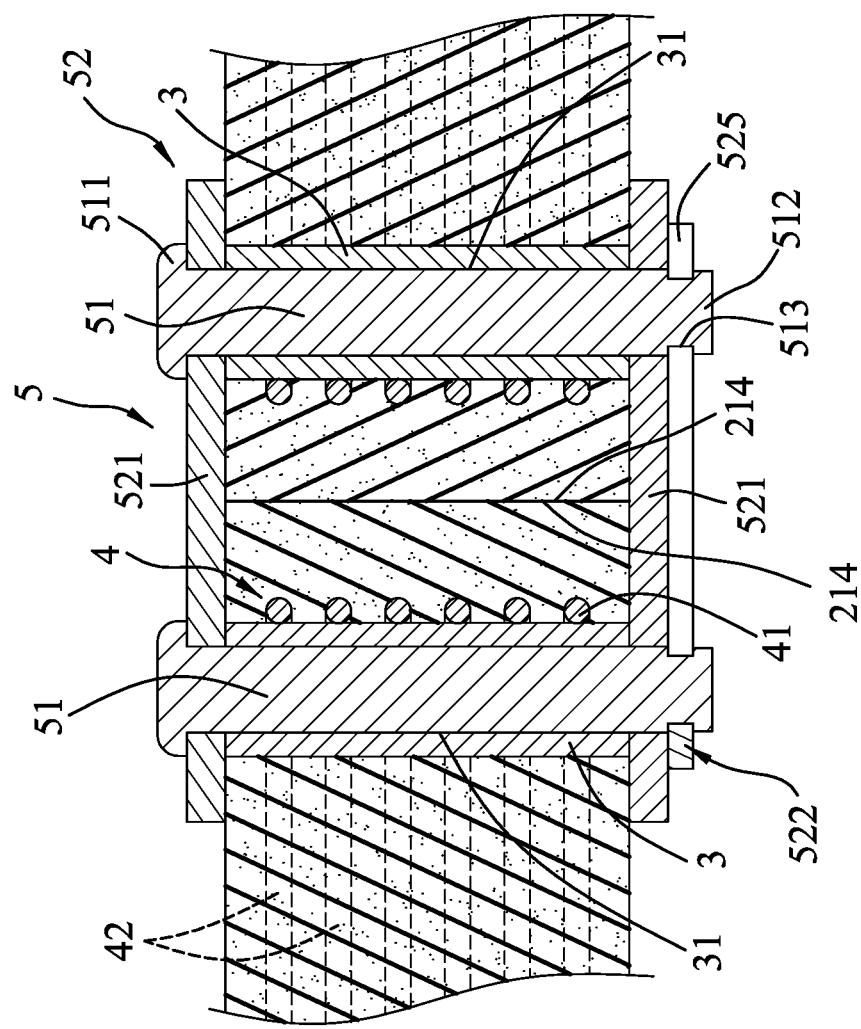
FIG. 8 is fragmentary sectional view illustrating the first embodiment.

Referring to FIGS. 4, 7 and 8, the connecting unit 5 includes two connecting pins 51 that respectively extend through the axial through holes 31 of the mounting axles 3, and a connecting assembly 52 that interconnects the connecting pins 51. Each of the connecting pins 51 has an enlarged head portion 511, and an engaging portion 512 that is opposite to the head portion 511 and that has an engaging groove 513 formed in an outer surrounding surface thereof. The connecting assembly 52 includes two L-shaped connecting plates 521 and a clip 522. Each of the connecting plates 521 has a connecting section 523 that is disposed adjacent to a respective one of the side surfaces 211 of the strip body 21, and a wing section 524 that is disposed adjacent to the outer surface 212 of the strip body 21. Preferably, the wing section 524 of each of the connecting plates 521 is arc-shaped, so as to form a space for accommodating the belt body 2 when the strip body 21 forms the loop. The clip 522 abuts against one of the connecting plate 521, and has two legs 525 each of which engages the engaging grooves 513 of the connecting pins 51.

In assembling, the connecting pins 51 are first inserted through the connecting section 523 of one of the connecting plates 521 so that the head portions 511 of the connecting pins 51 abut against an outer surface of the connecting section 523 of the one of the connecting plates 521. Then, the connecting pins 51 are respectively inserted through the axial through holes 31 of the mounting axles 3 and through the connecting section 523 of the other one of the connecting plates 521 before the legs 525 of the clip 522 engage the engaging grooves 513 of the connecting pins 51 so as to interconnect the longitudinal ends of the strip body 21 (i.e., to interconnect the mounting axles 3).

To manufacture the first embodiment, the reinforcing unit 4 is first looped on the spaced-apart mounting axles 3. Then, the reinforcing unit 4 and the mounting axles 3 are disposed in a mold before the belt body 2 is formed in the mold by injection molding. Finally, the connecting unit 5 is assembled to interconnect the longitudinal ends of the strip body 21 to form the loop, as mentioned above.

Figure 6:
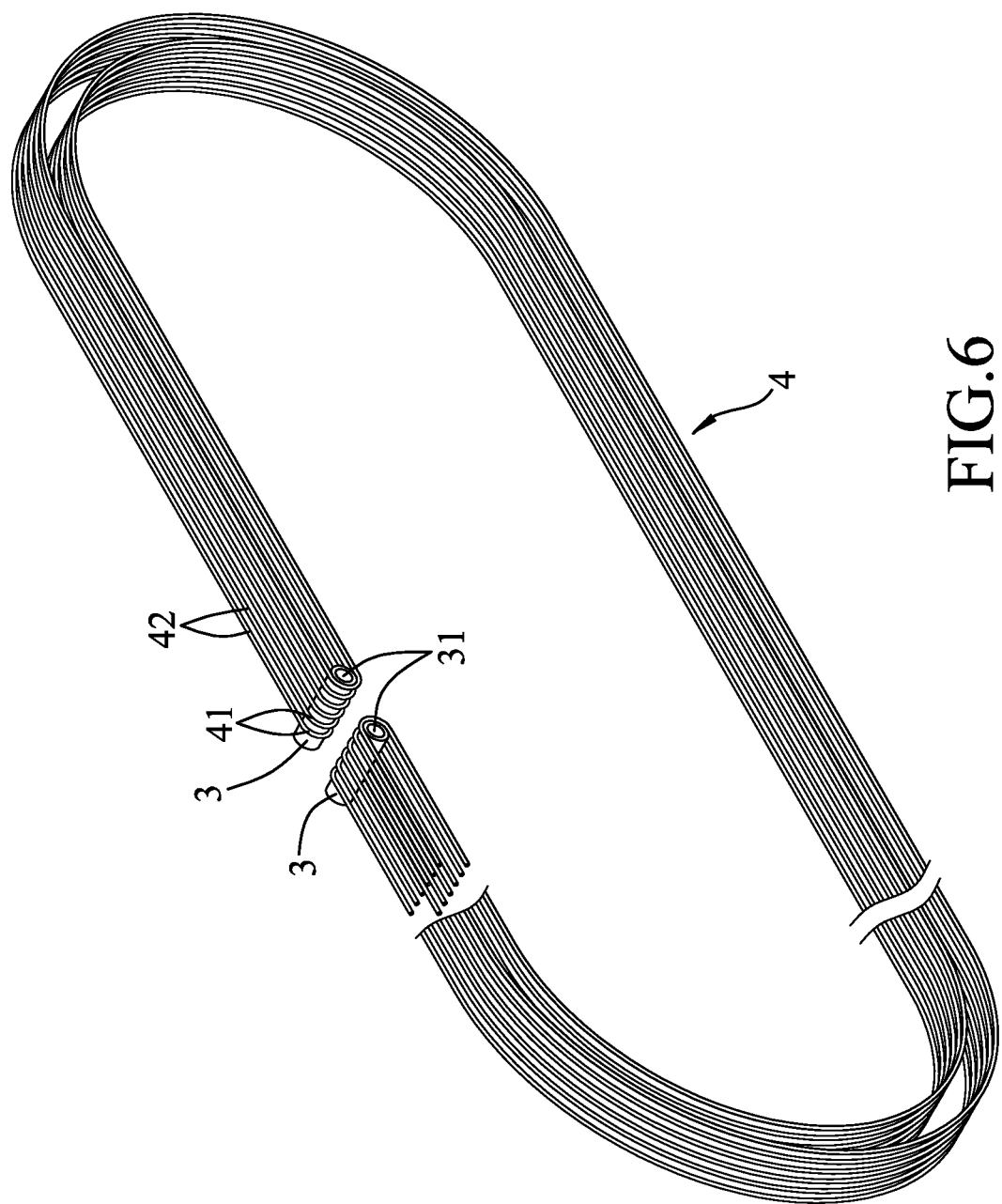
FIG. 6 is a fragmentary perspective view illustrating two mounting axles and a reinforcing unit of the first embodiment.

Referring to FIGS. 4, 6 and 8, since the reinforcing unit 4 extends around the mounting axles 3 to form at least one loop and since the connecting unit 5 firmly interconnects the longitudinal ends of the strip body 21, when the first embodiment is in operation (see FIG. 5), the strength of the first embodiment may not be limited to the binding force between the reinforcing unit 4 and the belt body 2. Moreover, the connecting unit 5 can be easily assembled and de-assembled for mounting the first embodiment on pulleys.

Figure 9:
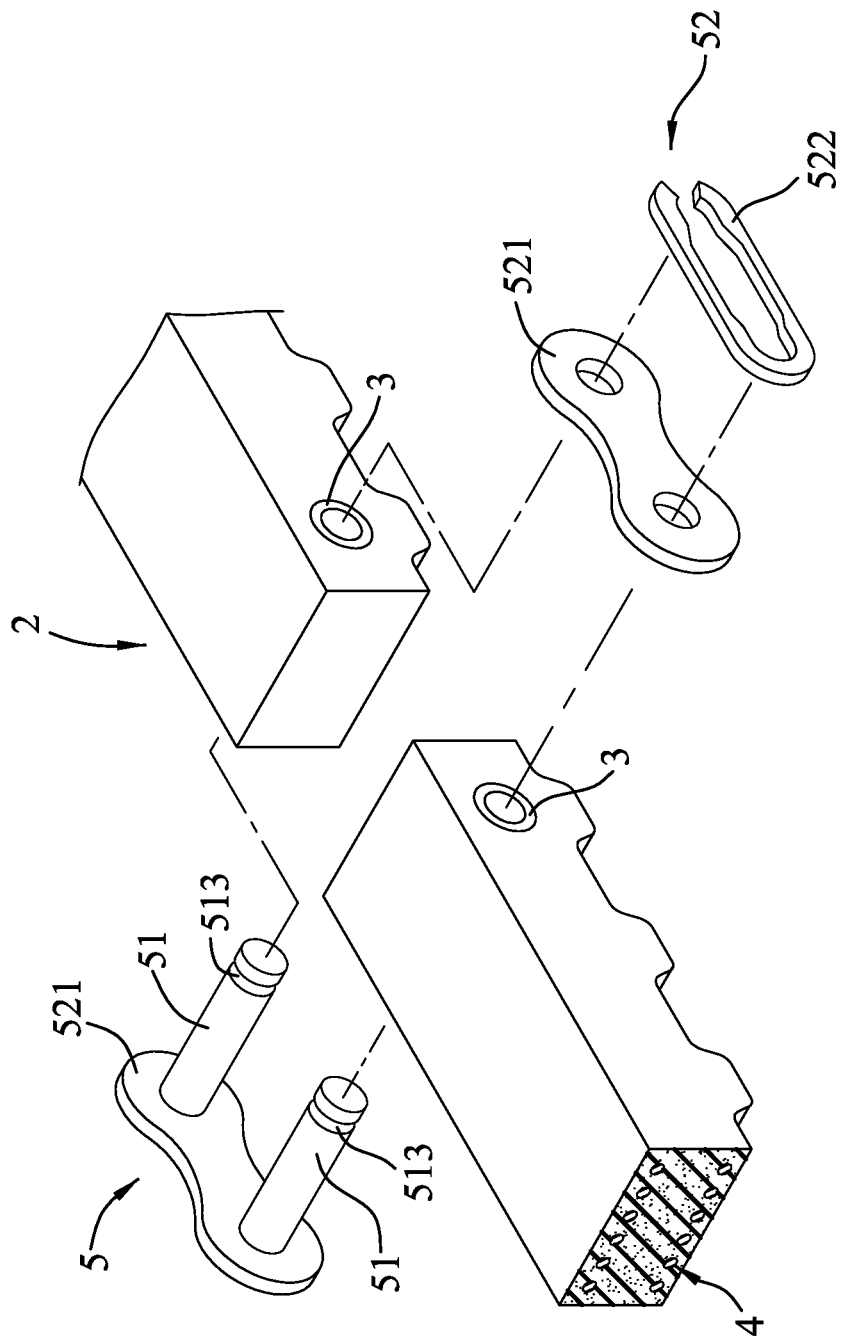
FIG. 9 is an exploded perspective view illustrating a connecting unit of a second embodiment of the transmission belt according to the disclosure.

Referring to FIG. 9, the second embodiment of the transmission belt according to the disclosure is similar to the first embodiment. The difference between the first and second embodiments resides in the connecting unit 5. The connecting unit 5 of the second embodiment includes two connecting pins 51 that respectively extend through the mounting axles 3, and a connecting assembly that interconnects the connecting pins 51. The connecting assembly 52 includes two flat connecting plates 521 that are respectively disposed at two opposite sides of the belt body 2, and a clip 522 that engages the engaging grooves 513 of the connecting pins 51.

Figure 10:
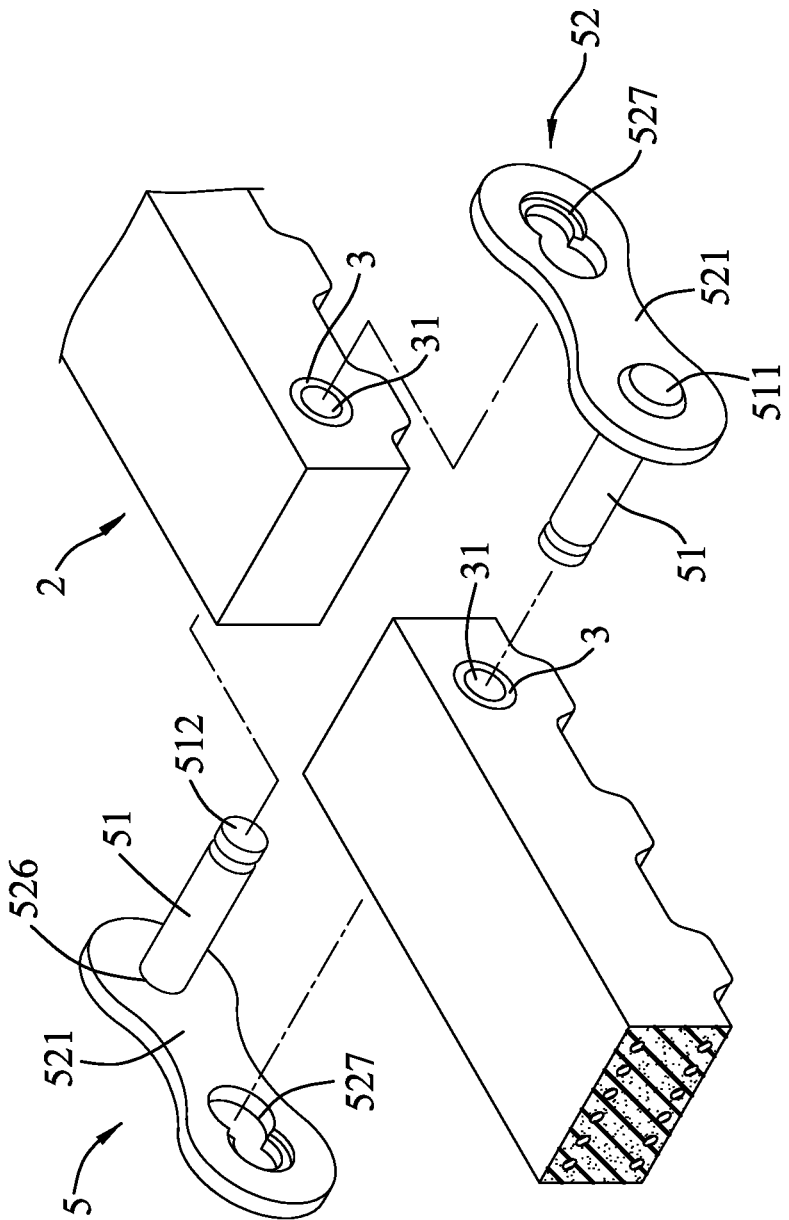
FIG. 10 is an exploded perspective view illustrating a connecting unit of a third embodiment of the transmission belt according to the disclosure.

Referring to FIG. 10, the third embodiment of the transmission belt according to the disclosure is similar to the first embodiment. The difference between the first and third embodiments resides in the connecting unit 5. The connecting unit 5 of the third embodiment includes two connecting pins 51 that respectively extend through the mounting axles 3, and a connecting assembly 52 that interconnects the connecting pins 51. The connecting assembly 52 includes two connecting plates 521 that are respectively disposed at two opposite sides of the belt body 2. Each of the connecting plates 521 has an insertion hole 526 that permits insertion of one of the connecting pins 51, and an engaging hole 527 that is engaged with the engaging portion 512 of the other one of the connecting pins 51.

In assembling, each of the connecting pins 51 is first inserted through the insertion hole 526 of a respective one of the connecting plates 521 so that the head portion 511 thereof abuts against the respective one of the connecting plates 521. Then, the engaging portion 512 of each of the connecting pins 51 are inserted through the axial through hole 31 of a respective one of the mounting axles 3 and through the engaging hole 527 of the other one of the connecting plates 521. Finally, two opposite longitudinal ends of the belt body 2 are pulled away from each other, so that the engaging portions 512 of the connecting pins 51 are respectively engaged with the engaging holes 527 of the connecting plates 521.

Figure 11:
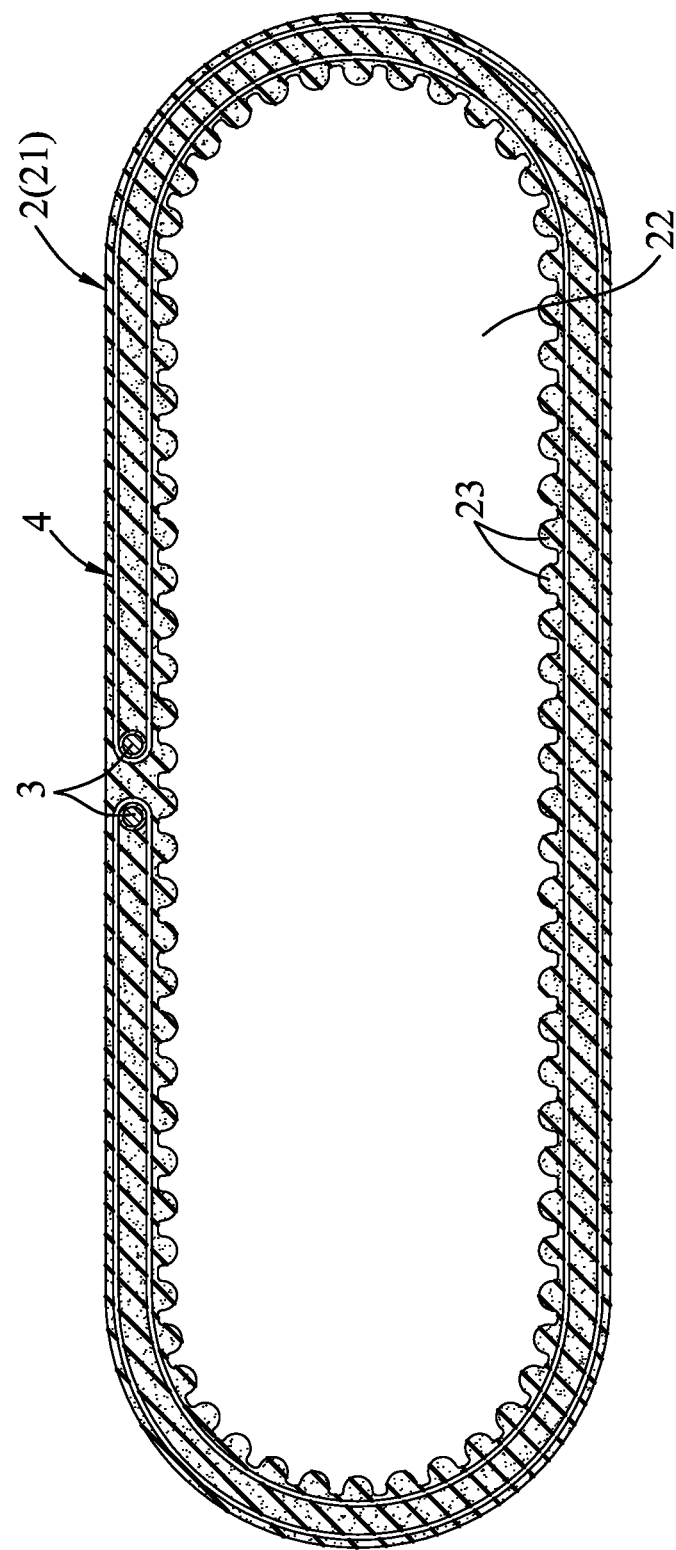
FIG. 11 is a sectional view illustrating a fourth embodiment of the transmission belt according to the disclosure.

Referring to FIG. 11, the fourth embodiment of the transmission belt according to the disclosure includes the belt body 2, the mounting axles 3 and the reinforcing unit 4. The mounting axles 3 and the reinforcing unit 4 of the fourth embodiment are substantially identical to those of the first embodiment. The strip body 21 of the belt body 2 of the fourth embodiment is configured as an integrally-formed hoop that defines the inner space 22. Each of the teeth 23 has a semi-circular shape. The connecting unit 5 (see FIGS. 4, 9 and 10) of the first to third embodiments can be assembled to the fourth embodiment to enhance the strength of the fourth embodiment.

Figure 12:
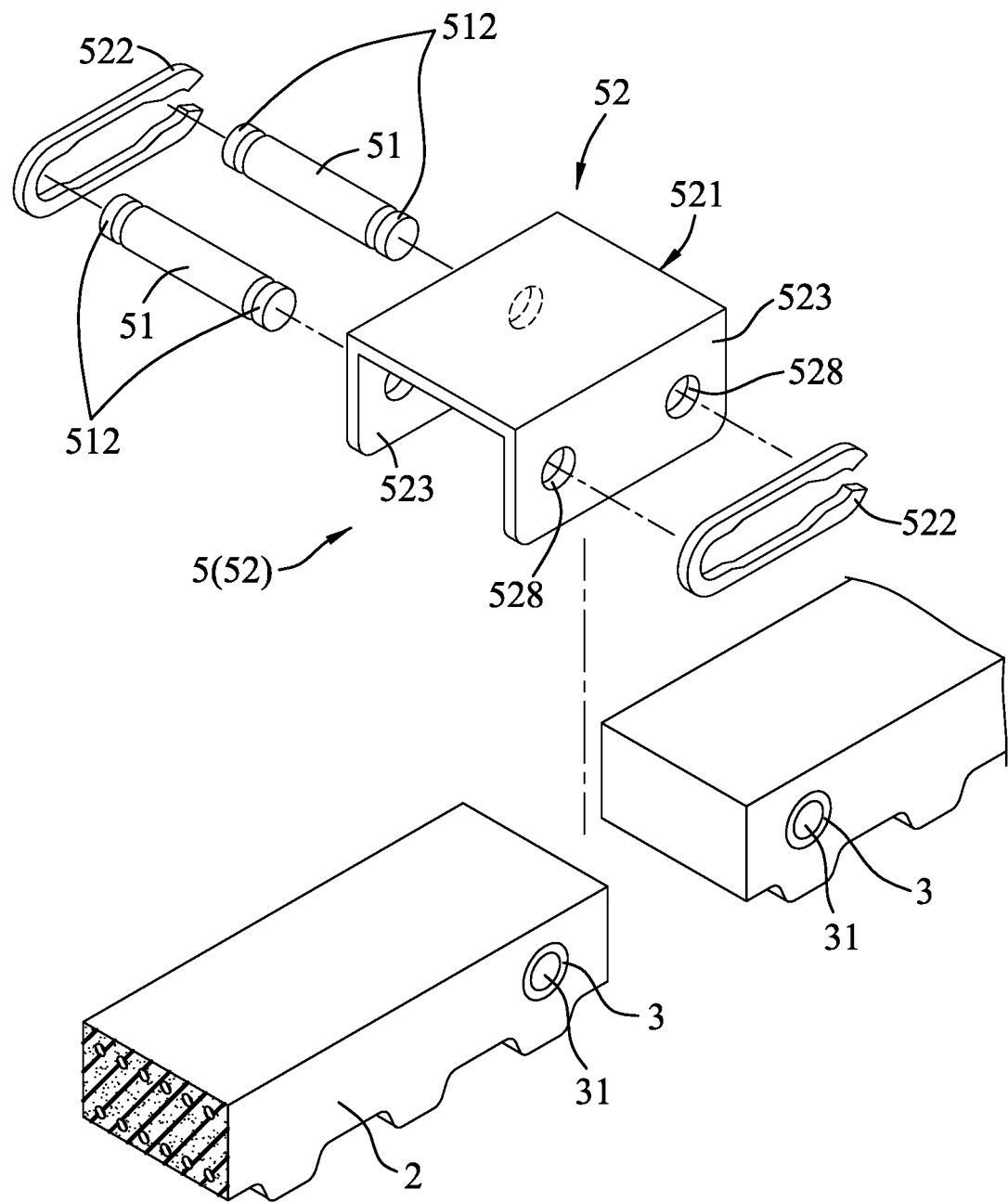
FIG. 12 is an exploded perspective view illustrating a connecting unit of a fifth embodiment of the transmission belt according to the disclosure.

Referring FIG. 12, the fifth embodiment of the transmission belt according to the disclosure is similar to the first embodiment. The difference between the first and fifth embodiments resides in the connecting unit 5. The connecting unit 5 of the fifth embodiment includes two connecting pins 51 that respectively extend through the axial through holes 31 of the mounting axles 3, and a connecting assembly 52 that interconnects the connecting pins 51. Each of the connecting pins 51 has two opposite engaging portions 512. The connecting assembly 52 includes a connecting plate 521 that has a C-shaped cross-section, and two clips 522. Each of the clips 522 is configured to be identical to the clip 522 of the first embodiment. The connecting plate 521 has two connecting sections 523 that are respectively disposed adjacent to two opposite sides of the belt body 2. Each of the connecting sections 523 is formed with two connecting holes 528 that are respectively aligned with the connecting holes 528 of the other one of the connecting sections 523. The connecting pins 51 respectively extend through the axial through holes 31 of the mounting axles 3 and through the connecting holes 528 of each of the connecting sections 523. Each of the clips 522 is engaged with an engaging portion of one of the connecting pins 51 and a corresponding engaging portion of the other one of the connecting pins 51.

Figure 13:
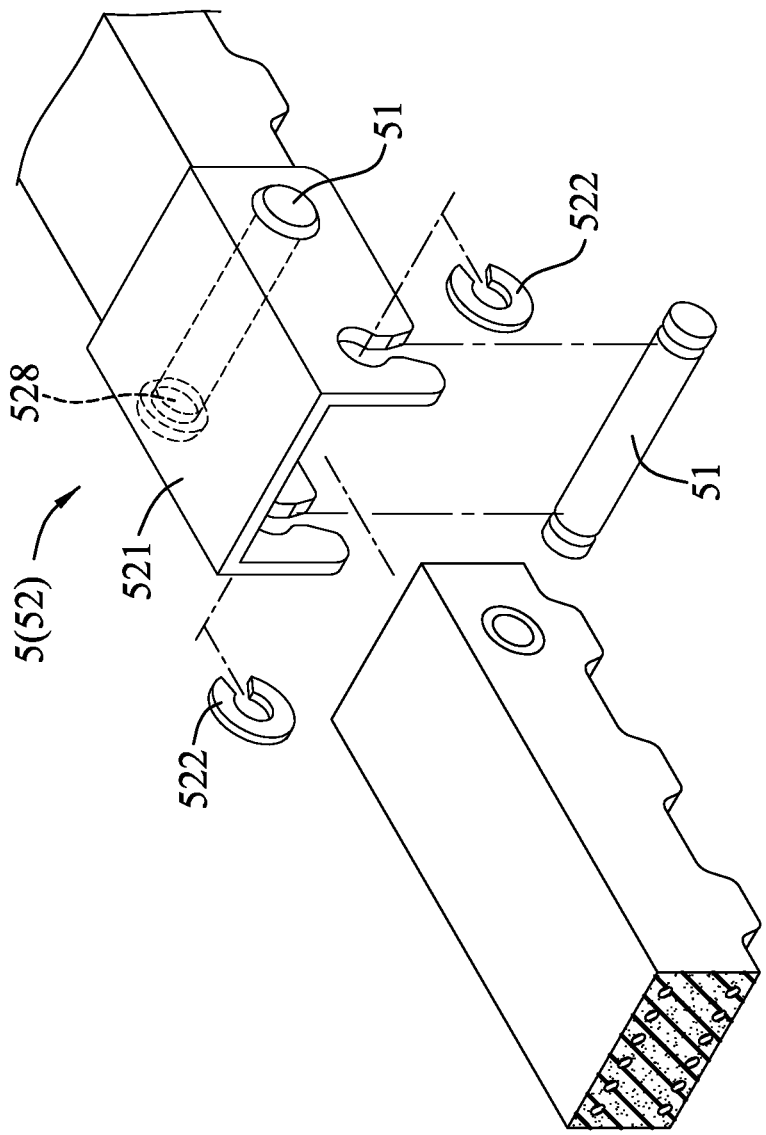
FIG. 13 is a partly exploded perspective view illustrating a connecting unit of a sixth embodiment of the transmission belt according to the disclosure.

Referring to FIG. 13, the connecting unit 5 of the sixth embodiment of the transmission belt according to the disclosure includes two connecting pins 51 and a connecting assembly 52. The connecting assembly 52 includes a connecting plate 521 that has a C-shaped cross-section, and two clips 522. In this embodiment, one of the connecting pins 51 is inseparably fixed to the connecting plate 521, and the other one of the connecting pins 51 is positioned relative to the connecting plate 521 by the clips 522.

In the description above, for the purposes of explanation, numerous specific details have been set forth in order to provide a thorough understanding of the embodiments. It will be apparent, however, to one skilled in the art, that one or more other embodiments may be practiced without some of these specific details. It should also be appreciated that reference throughout this specification to "one embodiment," "an embodiment," an embodiment with an indication of an ordinal number and so forth means that a particular feature, structure, or characteristic may be included in the practice of the disclosure. It should be further appreciated that in the description, various features are sometimes grouped together in a single embodiment, figure, or description thereof for the purpose of streamlining the disclosure and aiding in the understanding of various inventive aspects.

While the disclosure has been described in connection with what are considered the exemplary embodiments, it is understood that this disclosure is not limited to the disclosed embodiments but is intended to cover various arrangements included within the spirit and scope of the broadest interpretation so as to encompass all such modifications and equivalent arrangements.

What is claimed is:

1. A transmission belt comprising:
   a belt body forming a loop that defines an inner space;
   two spaced-apart mounting axles embedded in said belt body; and
   a reinforcing unit embedded in said belt body, said reinforcing unit including at least one cord that has a plurality of winding segments and a plurality of connecting segments, said winding segments alternately extending around said mounting axles, each of said connecting segments interconnecting a corresponding pair of said winding segments that respectively extend around said mounting axles.

2. The transmission belt as claimed in claim 1, wherein said belt body includes a strip body that has two opposite end surfaces, said mounting axles being respectively disposed adjacent to said end surfaces, said transmission belt further comprising a connecting unit that interconnects said mounting axles so that said strip body forms a loop to define said inner space.

3. The transmission belt as claimed in claim 2, wherein said belt body further includes a plurality of spaced-apart teeth each of which extends from said strip body toward said inner space.

4. The transmission belt as claimed in claim 3, wherein said strip body has two opposite side surfaces, and two mounting holes each of which is formed through said side surfaces and permits a respective one of said mounting axles to be disposed therein.

5. The transmission belt as claimed in claim 4, wherein each of said mounting axles is configured to be tubular, said connecting unit including two connecting pins that respectively extend through said mounting axles, and a connecting assembly that interconnects said connecting pins.

6. The transmission belt as claimed in claim 5, wherein said connecting assembly includes a connecting plate that has a C-shaped cross-section, and two clips, said connecting plate having two connecting sections that are respectively disposed adjacent to two opposite sides of said belt body, each of said connecting sections being formed with two connecting holes that are respectively aligned with said connecting holes of the other one of said connecting sections, said connecting pins respectively extending through said mounting axles and through said connecting holes of each of said connecting sections, each of said clips being engaged with said connecting pins.

7. The transmission belt as claimed in claim 6, wherein one of said connecting pins is inseparably fixed to said connecting plate.

8. The transmission belt as claimed in claim 5, wherein said strip body further has an inner surface that defines said inner space and that is connected between said side surfaces, and an outer surface that is opposite to said inner surface and that is connected between said side surfaces, said connecting assembly including two connecting plates that are respectively disposed adjacent to said side surfaces and that permits said connecting pins to extend therethrough, and a clip that is engaged with said connecting pin and that abuts against one of said connecting plates.

9. The transmission belt as claimed in claim 8, wherein each of said connecting pins has an enlarged head portion that abuts against an outer surface of one of said connecting plates, and an engaging portion that extends through the other one of said connecting plates and that has an engaging groove formed in an outer surrounding surface thereof, said clip having two legs each of which engages said engaging grooves of said connecting pins.

10. The transmission belt as claimed in claim 5, wherein said strip body further has an inner surface that defines said inner space and that is connected between said side surfaces, and an outer surface that is opposite to said inner surface and that is connected between said side surfaces, said connecting assembly including two connecting plates that permits said connecting pins to extend therethrough, and a clip that is engaged with said connecting pin and that abuts against one of said connecting plates, each of said connecting plates having a connecting section that is disposed adjacent to a respective one of said side surfaces of said strip body, and a wing section that is disposed adjacent to said outer surface of said strip body, each of said connecting pins having an enlarged head portion that abuts against an outer surface of said connecting section of one of said connecting plates, and an engaging portion that extends through said connecting section of the other one of said connecting plates and that has an engaging groove formed in an outer surrounding surface thereof, said clip having two legs each of which engages said engaging grooves of said connecting pins.

11. The transmission belt as claimed in claim 5, wherein each of said connecting pins has an enlarged head portion, and an engaging portion opposite to said head portion, said connecting assembly including two connecting plates that are respectively disposed at two opposite sides of said belt body, each of said connecting plates having an insertion hole that permits insertion of one of said connecting pins, and an engaging hole that is engaged with said engaging portion of the other one of said connecting pins.

12. The transmission belt as claimed in claim 1, wherein said belt body includes a strip body that is configured as an integrally-formed hoop and that defines said inner space.

13. The transmission belt as claimed in claim 12, wherein said belt body further includes a plurality of spaced-apart teeth each of which extends from said strip body toward said inner space.

14. The transmission belt as claimed in claim 13, wherein said strip body has two opposite side surfaces, and two mounting holes each of which is formed through said side surfaces and permits a respective one of said mounting axles to be disposed therein.

15. The transmission belt as claimed in claim 1, wherein said reinforcing unit including a plurality of said cords, each of said cord being configured as a flexible hoop and having two of said winding segments that respectively extend around said mounting axles, and two of said connecting segments each of which interconnects of said winding segments.

16. The transmission belt as claimed in claim 1, wherein each of said mounting axles is configured to be cylindrical.

* * * * *